3,585,206
CERTAIN 5-PHENETHYL-PICOLINIC ACID DERIVATIVES
Peter J. L. Daniels, Cedar Grove, N.J., assignor to Schering Corporation, Bloomfield, N.J.
No Drawing. Filed Mar. 26, 1969, Ser. No. 810,825
Int. Cl. C07d 31/36
U.S. Cl. 260—295   5 Claims

ABSTRACT OF THE DISCLOSURE

This application relates to novel 5-($\beta$-phenethyl)-picolinic acids and certain derivatives thereof and to their use as hypoglycemic agents.

---

This invention relates to novel compositions of matter which may be generically described as 5-($\beta$-phenethyl)-picolinic acids, to processes for their preparation and to their applied use characteristic as hypoglycemics.

The invention sought to be patented in one of its composition of matter aspects may be described as residing in the concept of a chemical compound having the molecular structure of a 5-($\beta$-phenethyl)picolinic acid, to certain esters thereof, said compounds optionally having in the phenethyl moiety thereof, a substituent of the group consisting of nitro, amino, chloro, bromo, fluoro, lower alkoxy and lower alkyl. Included within this concept are the non-toxic pharmaceutically acceptable metal and ammonium salts of the aforementioned acids.

The invention sought to be patented in another of its composition of matter aspects resides in the concept of pharmaceutical dosage forms containing a novel compound of this invention.

This invention sought to be patented in its process-of-use aspect may be described as residing in the concept of treating and preventing hyperglycemia by administering a therapeutically useful quantity of a novel compound of this invention.

A more specific representation of the tangible embodiments of this invention are the chemical compositions having the structural formula:

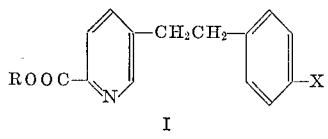

I and the non-toxic pharmaceutically acceptable metal and ammonium salts thereof wherein R is either hydrogen or lower alkyl and X is a member of the group consisting of hydrogen, nitro, amino, chloro, bromo, fluoro, trifluoromethyl, lower alkyl and lower alkoxy. In those instances wherein "R" and/or "X" is representative of lower alkyl or lower alkoxy, preferred radicals are methyl, ethyl and methoxy, although such radicals include those groups having up to six carbon atoms.

In general, the compounds of this invention are prepared from 2-methyl-5-(p-X-$\beta$-phenethyl) pyridine intermediates by standard oxidative techniques wherein the 2-methyl radical is converted to the desired carboxyl grouping. In effecting this conversion it is convenient to employ a selenium dioxide oxidative system wherein the conversion is more direct. However, other oxidative techniques well known to the art may also be utilized with equal effect. For example, the 2-methyl-5-(p-X-$\beta$-phenethyl) pyridine may be reacted with benzaldehyde in the presence of acetic anhydride to form the corresponding 2-styryl-5-(p-X-$\beta$-phenethyl) pyridine which compound may then be oxidized, with for example, potassium permanganate in acetone, to produce the desired 5-(p-X-$\beta$-phenethyl)picolinic acid. In those instances wherein selenium dioxide is employed it is preferred to heat the appropriate 2-methyl-5-(p-X-$\beta$-phenethyl) pyridine at reflux temperatures using inert solvents such as pyridine.

The preparation of the desired 2-methyl-5-(p-X-$\beta$-phenethyl) pyridine intermediates is readily effected by condensing 2-methyl-5-pyridine aldehyde with an appropriately substituted diethyl benzylphosphonate (e.g. diethyl-p-chlorobenzylphosphonate), and chemically reducing the 2-methyl-5-styryl pyridine intermediate. This general sequence of reactions may be structurally depicted as follows:

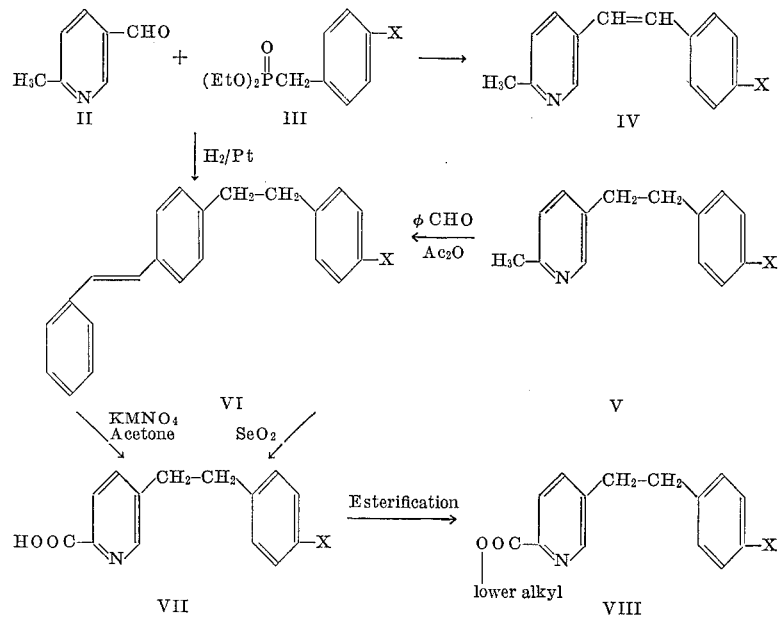

wherein X is as defined above.

In the above described procedures the preparation of the X-substituted compounds is effected with the X-substituent already present in the diethyl benzylphosphonate reactant (III). In those cases wherein X is chloro, bromo, fluoro, trifluoromethyl, alkoxy and alkyl, such a procedure is preferred. However, in the specific instance wherein X is nitro or amino, it is preferred to first prepare the 5-phenethylpicolinic acid and then introduce the nitro substituent which substituent may then be reduced to form the amino substituent.

The foregoing methods of preparation, as well as other equivalently functioning methods are illustrated by the following examples, said examples to be illustrative of the methods of preparation and are not to be construed as limiting in scope.

EXAMPLE I

Preparation of 5-(β-phenethyl)picolinic acid

To 159 g. (0.8 mole) of 3-phenethylpyridine-N-oxide in a nitrogen atmosphere, slowly add 100.4 g. of dimethyl sulfate whilst stirring at 80–85° C. Cool the mixture, dilute with 230 ml. of water and add a solution of 117 g. of sodium cyanide in 330 ml. of water whilst cooling to 0° C. Stir the reaction mixture at 0° C. for 3.5 hours and continue stirring at room temperature for another 16 hours. Extract with chloroform, dry and evaporate the solvent to give an oil which upon fractional distillation affords 3-phenethylpicolinonitrile, B.P. 183–186°/3 mm. and 5-phenethylpicolinonitrile, B.P. Mix and boil together 50 g. of 5-phenethylpicolinonitrile, 50 g. of potassium hydroxide, 150 ml. of water and 50 ml. of ethanol for 82 hours. Evaporate the solvents in vacuo and dissolve the residue in water. Acidify with acetic acid and filter off the precipitate which is recrystallized from hot water to yield 5-(β-phenethyl)picolinic acid, M.P. 154–156.5° C.

EXAMPLE II 5-(p-nitro-β-phenethyl)picolinic acid

An intimate mixture of 8.92 g. of potassium nitrate and 20 g. of 5-(β-phenethyl)picolinic acid is added in small amounts to 220 ml. of sulfuric acid with stirring and cooling to −5° C. The resulting solution is poured into water and the precipitate filtered off, extracted with boiling water and ethanol and then dried to yield 5-(p-nitro-β-phenethyl)picolinic acid, M.P. 182–184° C.

EXAMPLE III 5-(p-amino-β-phenethyl)picolinic acid

A solution of 13.45 g. of 5-(p-nitro-β-phenethyl)picolinic acid in 650 ml. of acetic acid is hydrogenated in a Parr shaking apparatus over 1.5 g. of 5% palladium on carbon catalyst. When the theoretical amount of hydrogen is taken up, the catalyst is removed by filtration and the solvent removed in vacuo to yield 5-(p-amino-β-phenethyl)picolinic acid, M.P. 214.5° C. with decomposition.

EXAMPLE IV 2-methyl-5-(p-chlorostyryl) pyridine

In an inert atmosphere treat 19.96 g. of diethyl p-chlorobenzylphosphonate (prepared from p-chlorobenzylchloride and triethylphosphite) in 25 ml. of dry dimethylformamide with 4.3 g. of sodium methylate. Cool and stir the resulting mixture and add slowly, in a portion-wise fashion, 9.2 g. of 2-methyl-5-pyridine aldehyde dissolved in 45 ml. of dimethylformamide, keeping the temperature between 30–35° C. After addition is complete stir for 30 minutes at room temperature and pour the mixture over 350 g. of ice. Filter and recrystallize the precipitate from hexane to yield 2-methyl-5-(p-chlorostyryl) pyridine, M.P. 130–131° C.

In a similar manner by condensing 2-methyl-5-pyridine aldehyde with diethyl-p-bromobenzylphosphonate, diethyl-p-fluorobenzylphosphonate, diethyl - p - trifluoromethylbenzylphosphonate, diethyl - p - methylbenzylphosphonate, according to the procedure of this example, there is produced 2-methyl-5-(p-bromo-β-styryl) pyridine, M.P. 151–152° C., 2-methyl-5-(p-fluoro-β-styryl) pyridine, M.P. 87–92° C., 2-methyl-5-(p-trifluoromethyl-β-styryl) pyridine, and 2-methyl-5-(p-methyl-β-styryl) pyridine, M.P. 163.5–164° C., respectively.

EXAMPLE V 2-methyl-5-(p-chloro-β-phenethyl) pyridine 6 g. of 2-methyl-5-(p-chloro-β-styryl) pyridine is dissolved in acetic acid and hydrogenated over 0.5 g. of Adams platinum catalyst. After the uptake of 1 mole of hydrogen, the reaction is stopped, the reaction mixture filtered and the solvent evaporated in vacuo to yield 2-methyl-5-(p-chloro-β-phenethyl) pyridine, M.P. 52–54° C. In a similar manner the previously obtained 2-methyl-5-(p-fluoro-β-styryl) pyridine, 2-methyl-5-(p-bromo-β-styryl) pyridine, 2-methyl-5-(p-trifluoromethyl-β-styryl) pyridine, and 2-methyl-5-(p-methyl-β-styryl) pyridine are hydrogenated in an analogous fashion to obtain 2-methyl-5-(p-fluoro-β-phenethyl) pyridine, 2-methyl-5-(p-bromo-β-phenethyl) pyridine, 2-methyl - 5 - (p-trifluoromethyl-β-phenethyl) pyridine and 2-methyl-5-(p-methyl-β-phenethyl) pyridine, respectively.

EXAMPLE VI 2-methyl-5-(p-methoxy-β-phenethyl) pyridine

To 25 g. of p-methoxybenzylamine, add a solution of 22 g. of 2-methyl-5-pyridine aldehyde in methanol and allow the mixture to stand at room temperature for 2 hours. Stir and cool the solution to −5° C. and slowly add, in a portion-wise fashion, 10 g. of sodium borohydride, keeping the temperature of the reaction mixture at −5° C. during the addition. Allow the reaction mixture to stand overnight at room temperature. Evaporate 95% of the methanol in vacuo and add 400 ml. of water. Extract the mixture with two 200 ml. portions of ether and extract the ethereal solution with 6 N hydrochloric acid. Basify the acid extracts with sodium hydroxide and extract the desired production with ether. Dry and evaporate off the ether to yield 38.8 g. of p-methoxybenzyl-2-methyl-5-pyridylmethylamine.

To the above amine add 14.7 ml. of concentrated hydrochloric acid and 250 ml. of water and heat the resulting mixture to 70° C. and slowly add a solution of 8.97 g. of sodium nitrite in 25 ml. of water. Stir the reaction mixture for 30 minutes at 70° C. and allow the mixture to cool. Treat the cooled mixture with excess sodium carbonate and extract with ether. Water-wash dry and evaporate off the ether to yield the liquid N-nitroso intermediate.

Dissolve the nitroso intermediate in 945 ml. of 20% sodium hydroxide solution and 945 ml. of ethanol and to this stirred solution, at 60° C. add 50.4 g. of sodium hydrosulfite. Vigorously stir the reaction mixture for 4.5 hours at 65–70° C., cool and concentrate the mixture to one-half volume, extract with two portions of 400 ml. of ether and extract the ether with two 200 ml. portions of 10% hydrochloric acid. Basify the acid extracts and extract with ether. Dry, filter and evaporate the ether extracts to yield 25.3 g. of 2-methyl-5-(p-methoxy-β-phenethyl) pyridine.

EXAMPLE VII 2-styryl-5-(p-chloro-β-phenethyl) pyridine

Heat at reflux temperature a mixture containing 11.6 g. of 2-methyl-5-(p-chloro-β-phenethyl) pyridine, 23 ml. of benzaldehyde and 25 ml. of acetic anhydride for 3 to 5 days. Evaporate the resulting mixture to dryness and recrystallize the residue from methanol to yield 2-styryl-5-(p-chloro-β-phenethyl) pyridine, M.P. 128.5–129.5° C. In a similar manner by carrying out the analogous procedure from 2-methyl-5-(p-fluoro-β-phenethyl) pyridine, 2-methyl-5-(p-methoxy-β-phenethyl) pyridine and 2-methyl-5-(p-methyl-β-phenethyl) pyridine there is produced 2-styryl-5-(p-fluoro-β-phenethyl) pyridine, M.P. 116° C., 2-styryl-5-(p-methoxy-β-phenethyl) pyridine, M.P. 147.5–148.5° C. and 2-styryl-5-(p-methyl-β-phenethyl) pyridine, M.P. 127–128° C., respectively.

EXAMPLE VIII

5-(p-chloro-β-phenethyl)picolinic acid

Cool to −5° C. a solution of 0.48 g. of 5-(p-amino-β-phenethyl)picolinic acid in a mixture of 1 ml. of concentrated hydrochloric acid and 1.5 ml. of water and diazotize by the addition of an aqueous solution of 0.14 g. of sodium nitrite. Add an excess of an aqueous solution of cuprous chloride and allow the reaction mixture to stand for 16 hours. Filter and suspend the precipitate in a mixture of water and chloroform and bubble hydrogen sulfide through the mixture to liberate the acid from its copper salt. Filter and separate the layers, dry and evaporate the chloroform layer to yield 5-(p-chloro-β-phenethyl)picolinic acid, M.P. 185–189° C. which, when crystallized from chloroform-hexane, melts at 204° C. with decomposition.

Alternatively, 5-(p-chloro-β-phenethyl)picolinic acid is prepared as follows: Dissolve 10 g. of 2-methyl-5-(p-chloro-β-phenethyl) pyridine in 50 ml. of pyridine and add 14.4 g. of selenium dioxide. Reflux the reaction mixture for 3 hours and remove the pyridine by evaporation in vacuo. Treat the residue with a mixture of ammonium hydroxide and chloroform, separate and extract the chloroform layer with ammonium hydroxide. Combine and heat the basic extracts and decolorize with animal charcoal and filter. Acidify the filtrate to pH 2 and extract with chloroform. Dry and evaporate the chloroform extracts to yield 5-(p-chloro-β-phenethyl)picolinic acid, M.P. 196–198° C. with decomposition.

In a similar manner oxidize 2-methyl-5-(p-bromo-β-phenethyl) pyridine with selenium dioxide to yield 5-(p-bromo-β-phenethyl)picolinic acid, M.P. 202–205° C.

EXAMPLE IX

5-(p-methyl-β-phenethyl)picolinic acid

A mixture of 2-styryl-5-(p-methyl-β-phenethyl) pyridine and 120 ml. of acetone is cooled to −10° C. and with vigorous stirring 6.66 g. of finely divided potassium permanganate is added slowly, in a portion-wise fashion, over a 1.5 hour period whilst maintaining the temperature below −5° C. Allow the mixture to stand at −15° C. for 15 hours, filter and wash the solids with chloroform and extract three times with 150 ml. of boiling water. Acidify the aqueous extracts with hydrochloric acid and extract with ether. Discard the ether extracts and basify the aqueous phase to pH 2.5 and filter and dry the precipitated acid which is recrystallized from benzene to yield 5-(p-methyl-β-phenethyl)picolinic acid, M.P. 192.5–194° C. In a similar manner 5-(p-fluoro-β-phenethyl)picolinic acid, M.P. 169–170° C. and 5-(p-methoxy-β-phenethyl)picolinic acid, M.P. 174–175° C. are prepared by the oxidation of 2-styryl-5-(p-fluoro-β-phenethyl) pyridine and 2-styryl-5-(p-methoxy-β-phenethyl) pyridine, respectively.

EXAMPLE X

Methyl 5-(β-phenethyl)picolinate

To a solution of 3.0 g. of 5-(β-phenethyl)picolinic acid in methanol (75 ml.) add 2.0 equivalents of ethereal diazomethane. Allow the solution to stand overnight. Add a few drops of acetic acid to decompose the excess diazomethane, and evaporate the solution to dryness. Recrystallize the ester from hexane to obtain methyl 5-(β-phenethyl)picolinate, M.P. 52–54°.

EXAMPLE XI

Methyl 5-(p-nitro-β-phenethyl)picolinate

A benzene solution of 5-(p-nitro-β-phenethyl)picolinic acid is treated with an excess of oxalyl chloride at room temperature for 16 hours. The mixture is evaporated to dryness in vacuo and more benzene added and evaporated to remove the last traces of oxalyl chloride. Methanol is added and the mixture refluxed for 30 minutes. The methanol is partially evaporated and excess sodium carbonate solution added. The precipitated solid is filtered off, dried and washed with a little chloroform affording pure methyl 5-(p-nitro-β-phenethyl)-picolinate, M.P. 134–137°.

EXAMPLE XII

Methyl 5-(p-amino-β-phenethyl)picolinate

Methyl 5-(p-nitro-β-phenethyl)picolinate in methanol is hydrogenated in a Parr shaker over 1.0 g. of 5% palladium on carbon catalyst until three equivalents of hydrogen are absorbed. The catalyst is filtered off and the solvent evaporated. Recrystallization from isopropyl ether affords methyl 5-(p-amino-β-phenethyl)picolinate (2.6 g.), M.P. 89–90°.

In a manner similar to the above-described esterification procedures there is also produced methyl 5-(p-chloro-β-phenethyl)-picolinate, methyl 5 - (p-bromo-β-phenethyl)picolinate, methyl 5 - (p-fluoro-β-phenethyl)picolinate, methyl 5-(p-trifluoromethyl-p-phenethyl) picolinate, methyl 5-(p-methoxy-β-phenethyl)-picolinate and methyl 5-(p-methyl-β-phenethyl)picolinate.

The alkali metal salts of the novel compounds may be prepared by methods well known in the art for the preparation of a salt of a strong base with a weak acid. For example, the alkali metal salt, preferably the sodium salt may be obtained by evaporation of an alkaline (with sodium hydroxide) solution of the (β-phenethyl)picolinic acid described herein. Alternatively, non-aqueous media may be employed. For example, by mixing together an alcoholic solution of a (β-phenethyl)picolinic acid with an alcoholic solution containing a stoichiometric quantity of an alkali metal alkoxide and after evaporating the solvent, there is obtained the alkali metal salt which is soluble in water. In similar fashion and by other known techniques other functional derivatives—i.e., other non-toxic pharmaceutically acceptable salts are prepared. Representative of such salts are, in addition to sodium, those wherein the cation is ammonium, potassium, lithium, calcium, aluminum and other such metals which advantageously allow for greater solubility or greater ease in formulation and are considered the full equivalent of the free carboxylic acid.

By standard toxicity tests and by standard pharmacologic assays for the determination of hypoglycemic effects the compounds of this invention have been found to exhibit an interesting hypoglycemic profile. Indeed, from these tests, such as the standard alanine assay for the determination of hypoglycemic activity, it is found that the compounds exhibit hypoglycemic activity at dose ranges of 75–400 mg./kg. of body weight per day. Indeed, on the basis of the mechanism of this test procedure, it is reasonable to assume that the compounds of this invention may be useful in those hyperglycemic conditions which have been previously refractory to sulfonylurea-type therapy.

In their function as therapeutically useful compounds, it is advantageous to administer the compounds to the host animal in admixture with an acceptable pharmaceutical carrier suitable for enteral or parenteral administration, said carrier constituting a major portion of the admixture. Such preparations may be in such forms as, for example, tablets, capsules and suppositories, or in liquid forms as, for example, elixirs, emulsions, sprays and injectables. In the formulation of pharmaceutical preparations there can be employed such substances which do not react with the active substance as, for example, water, gelatin, lactose, starches, magnesium stearate, talc, vegetable oils, benzyl alcohols, gums, polyalkylene glycols, petroleum jelly and the like. The active ingredient of such pharmaceutical preparations is preferably present in the preparation in such proportions by weight that the proportion by weight of the active ingredient to be administered lies between 0.1% and 50%.

Representative embodiments of the formulations containing the compositions of this invention are as follows:

I.—TABLET FORMULATIONS

Enteric coated tablets

| Formula: | Mg./core |
|---|---|
| 5-(β-phenethyl)picolinic acid | 100.0 |
| Citric acid | 1.0 |
| Lactose, USP | 33.5 |
| Dicalcium phosphate | 70.0 |
| Pluronic F–68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A alcohol, 50 ml./1000 cores | ---- |
| Corn starch | 30.0 |
| Dry: | |
| Sodium lauryl sulfate | 3.0 |
| Magnesium stearate | 3.0 |
| Tablet weight | 350.0 |

Procedure: The 5-(β-phenethyl)picolinic acid is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, Carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen add sodium lauryl sulfate and magnesium sulfate, mix and compress into desired shape on a tablet machine.

Coating: The above cores are treated with a lacquer and dusted with talc to prevent moisture adsorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

II.—CAPSULE FORMULATIONS (A) Formula:

| | Mg./capsule |
|---|---|
| Methyl-5-[β-(phenethyl)]picolinate | 100.00 |
| Citric acid | 1.00 |
| Pluronic, F–68 | 40.00 |
| Sodium lauryl sulfate | 20.00 |
| Lactose | 238.00 |
| Magnesium stearate | 1.00 |
| | 400.00 |

Procedure: Mix together methyl-5-[β-(phenethyl)]-picolinate, citric acid, pluronic, sodium lauryl sulfate and lactose. Pass through a No. 80 screen. Add magnesium stearate, mix and encapsulate into the proper size 2-piece gelatin capsule.

(B) Formula:

| | Mg./capsule |
|---|---|
| Methyl-5-[β-(phenethyl)]picolinate | 100.0 |
| Dried aluminum hydroxide gel | 100.0 |
| Citric acid | 1.0 |
| Pluronic, F–68 | 50.0 |
| Sodium lauryl sulfate | 25.0 |
| Lactose | 222.0 |
| Magnesium stearate | 2.0 |
| | 500.0 |

Procedure: Mix together methyl-5-[β-(phenethyl)]-picolinate, citric acid, pluronic, sodium lauryl sulfate and lactose. Pass through a No. 80 screen. Add magnesium stearate, mix and encapsulate into the proper size 2-piece gelatin capsule adding the dried aluminum hydroxide gel to the mixture before screening.

III.—ORAL SUSPENSION

Formula:

| | |
|---|---|
| Methyl-5-[β-(phenethyl)]picolinate, mg./5 ml. | 100.0 |
| Veegum, Vanderbilt, mg./5 ml. | 50.0 |
| Standard granulated sugar, USP, mg./5 ml. | 2500.0 |
| Sorbitol solution, USP, mg./5 ml. | 1250.0 |
| Sodium saccharin, NF, mg./5 ml. | 50.0 |
| Sodium benzoate, USP, mg./5 ml. | 5.0 |
| Ethanol, USP, ml. | 0.025 |
| Menthol, USP, mg./5 ml. | 1.000 |
| Flavor, mg./5 ml. | Q.s. |
| Purified water, USP, to make 5 ml. | |

Method of manufacture: Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the methyl-5-[β-(phenethyl)]picolinate with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

I claim:
1. A compound of the group consisting of 5-(β-phenethyl)picolinic acids having the structural formula:

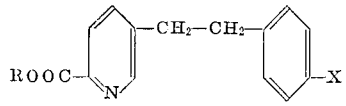

and the non-toxic pharmaceutically acceptable salts thereof wherein R is a member of the group consisting of hydrogen and lower alkyl and X is a member of the group consisting of hydrogen, chloro, bromo, fluoro, trifluoromethyl, lower alkyl, lower alkoxy, nitro and amino.

2. A compound of claim 1 wherein X and R are hydrogen, said compound being 5-(β-phenethyl)picolinic acid.

3. A compound of claim 1 wherein X is chloro and R is hydrogen, said compound being 5-(p-chloro-β-phenethyl)-picolinic acid.

4. A compound of claim 1 wherein X is hydrogen and R is methyl, said compound being methyl-5-(β-phenethyl)-picolinate.

5. A compound of claim 1 wherein X is chloro and R is methyl, said compound being methyl-5-(p-chloro-β-phenethyl)-picolinate.

References Cited

Prijs et al.: Chem. Abstracts, vol. 49, p. 8953, July 1955.

Farley et al.: J. Am. Chem. Soc., vol. 78, p. 3484 (1956).

ALAN L. ROTMAN, Primary Examiner

U.S. Cl. X.R.

424—266